(12) United States Patent
Yin et al.

(10) Patent No.: US 11,611,405 B2
(45) Date of Patent: Mar. 21, 2023

(54) EFFICIENT SPECTRUM ALLOCATION IN A MULTI-NODE OPTICAL NETWORK

(71) Applicant: MICROSOFT TECHNOLOGY LICENSING, LLC, Redmond, WA (US)

(72) Inventors: Yawei Yin, Redmond, WA (US); Karthikeyan Balasubramanian, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 131 days.

(21) Appl. No.: 16/990,921

(22) Filed: Aug. 11, 2020

(65) Prior Publication Data

US 2022/0052777 A1    Feb. 17, 2022

(51) Int. Cl.
*H04J 14/02*       (2006.01)
*H04Q 11/00*       (2006.01)

(52) U.S. Cl.
CPC ...... *H04J 14/0205* (2013.01); *H04J 14/0206* (2013.01); *H04J 14/0213* (2013.01);
(Continued)

(58) Field of Classification Search
CPC ............... H04J 14/0205; H04J 14/0206; H04J 14/0213; H04J 14/0216; H04J 14/0217;
(Continued)

(56) References Cited

U.S. PATENT DOCUMENTS

| | | |
|---|---|---|
| 5,809,423 A | 9/1998 | Benveniste |
| 5,835,859 A | 11/1998 | Doner |

(Continued)

FOREIGN PATENT DOCUMENTS

WO    2011100459 A1    8/2011

OTHER PUBLICATIONS

Fadini, et al., "A Subcarrier-slot Pariition Scheme for Wavelength Assignment in Elastic Optical Networks", In Proceedings of the IEEE 15th International Conference on High Performance Switching and Routing, Jul. 1, 2014, pp. 7-12.

Fukuda, et al., "Fragmentation-aware Spectrum Assignment for Elastic Optical Networks with Fully-Distributed GMPLS", In Proceedings of the Optical Fiber Communications Conference and Exhibition, Mar. 22, 2015, 3 Pages.

(Continued)

*Primary Examiner* — Dibson J Sanchez
(74) *Attorney, Agent, or Firm* — Newport IP, LLC; Han Gim

(57) ABSTRACT

An optical communications network comprises optical data links interconnected by add-drop nodes, the optical data links comprising data channels. The data channels are allocated into equal-sized bins. In response to a first data channel request between a given source-destination pair, one of the equal-sized bins is assigned to the data channel request. In response to requests for additional bandwidth for the same source-destination data channel request, unused channels within the assigned equal-sized bin are allocated to the data channel request. In response to subsequent data channel requests between different source-destination pairs, additional unallocated equal-sized bins are assigned to the subsequent data channel requests. In response to subsequent data channel requests when resource sharing for one equal-sized bin, data channels in the last equal-sized bin are assigned using the reverse channel assignment process. Reverse channel assignment can also be used for other bins as an option.

20 Claims, 10 Drawing Sheets

(52) U.S. Cl.
CPC ...... *H04J 14/0216* (2013.01); *H04J 14/0217* (2013.01); *H04J 14/02* (2013.01); *H04J 14/0257* (2013.01); *H04J 14/0263* (2013.01); *H04Q 2011/0086* (2013.01)

(58) Field of Classification Search
CPC .... H04J 14/0257; H04J 14/02; H04J 14/0263; H04Q 2011/0075; H04Q 2011/0086
USPC .................................................. 398/43–103
See application file for complete search history.

(56) References Cited

U.S. PATENT DOCUMENTS

| | | | |
|---|---|---|---|
| 7,554,916 | B2 | 6/2009 | Johnson |
| 8,279,767 | B2 | 10/2012 | Kang et al. |
| 9,369,785 | B1 | 6/2016 | Schmidtke et al. |
| 10,038,496 | B1* | 7/2018 | Wang ................ H04J 14/0271 |
| 10,348,439 | B1* | 7/2019 | Kim ................... H04L 41/0895 |
| 10,404,401 | B1* | 9/2019 | Maamoun ........... H04J 14/0271 |
| 10,516,482 | B1* | 12/2019 | Schmogrow ........ H04J 14/0257 |
| 2013/0195460 | A1* | 8/2013 | Kadohata ........... H04J 14/0257 398/79 |
| 2013/0216226 | A1* | 8/2013 | Hirano ................ H04J 14/0227 398/51 |
| 2013/0266316 | A1* | 10/2013 | Xia .................... H04Q 11/0067 398/48 |
| 2013/0272710 | A1* | 10/2013 | Wang ................. H04J 14/0257 398/79 |
| 2014/0294384 | A1* | 10/2014 | Wakabayashi ...... H04J 14/0257 398/49 |
| 2015/0095787 | A1* | 4/2015 | Bhaskara ................ H04L 41/22 715/735 |
| 2015/0207583 | A1* | 7/2015 | Nakajima ........... H04J 14/0212 398/79 |
| 2015/0341709 | A1* | 11/2015 | Friskney ................ H04L 45/70 398/45 |
| 2016/0352452 | A1* | 12/2016 | Takeshita ............ H04J 14/0263 |
| 2017/0054506 | A1* | 2/2017 | Takeshita ............ H04J 14/0224 |
| 2017/0180073 | A1* | 6/2017 | Takeshita ............... H04B 10/27 |
| 2017/0230113 | A1* | 8/2017 | Takita ................. H04J 14/0257 |
| 2018/0026716 | A1* | 1/2018 | Takita .................. H04B 10/572 398/82 |
| 2018/0083698 | A1* | 3/2018 | Hino ................... H04J 14/0263 |
| 2018/0234199 | A1 | 8/2018 | Bouda |
| 2019/0260474 | A1* | 8/2019 | Takeshita ............ H04J 14/0267 |
| 2019/0313168 | A1* | 10/2019 | Eira .................... H04J 14/0261 |
| 2020/0136743 | A1* | 4/2020 | Fujisawa ............ H04Q 11/0062 |
| 2022/0070559 | A1* | 3/2022 | Liu ..................... H04J 14/0256 |

OTHER PUBLICATIONS

Yuan, et al., "A routing and spectrum assignment algorithm in elastic optical network based on minimizing contiguity reduction", In Proceedings of the Photonic Network Communications, vol. 38, Issue 1, Apr. 26, 2019, pp. 51-61.

"International Search Report and Written Opinion Issued in PCT Application No. PCT/US21/037151", dated Oct. 11, 2021, 14 Pages.

Miao, et al., "Fundamentals of Mobile Data Networks", In Publication of Cambridge University Press, Mar. 3, 2016, 1 Page.

Li, et al., "Resource Allocation in Next Generation Wireless Networks", In Publication of Nova Publishers, 2005, 1 Page.

* cited by examiner

EFFICIENT SPECTRUM ALLOCATION IN A MULTI-NODE OPTICAL NETWORK

BACKGROUND

A data center is a facility that houses computer systems and various networking, storage, and other related components. Data centers may, for example, provide computing services to businesses and individuals as a remote computing service or provide "software as a service" (e.g., cloud computing). A data center may utilize fiber optic networks within a data center, between data centers, and to communicate with other networks. Fiber optic networks typically carry data for multiple end-to-end links.

It is important to distribute the data efficiently to ensure that all end-to-end links can be served, especially when overall network bandwidth is finite. Downtime due to network constraints and other issues may prevent the operation of services provided by the data center. When a data center experiences bandwidth issues, loss of data and services may occur, preventing users from providing quality services to their downstream customers, which may result in lost revenue and customer dissatisfaction.

It is with respect to these considerations and others that the disclosure made herein is presented.

SUMMARY

The disclosed embodiments describe technologies for avoiding spectrum fragmentation in communications networks, such as in an optical network. An optical network that allocates spectrum between multiple users, such as in an elastic optical network, may need to dynamically allocate the available transmission channels at multiple points along the network. Elastic optical networks enable higher spectral efficiency by overlapping orthogonal spectrum subcarriers or coherent optical comb lines. However, without costly wavelength conversion devices, elastic optical networks have a contiguous spectral constraint, which requires that when spectral resources are assigned to single connections, the assigned resources must be contiguous over the entire block in the spectrum domain. Spectrum fragmentation can thus occur due to careless planning and allocation of spectral resources into small noncontiguous spectral bands on fiber links.

For example, frequency slots can be allocated in a non-aligned and non-contiguous manner, resulting in gaps of unused available slots that have developed and that cannot be allocated to new connection requests due to the optical layer restrictions. Spectral fragments may lead to spectral underutilization and a potential blocking because of the difficulty in utilizing the available bandwidth by future connection requests, especially for those with multi-hop and/or large bandwidth demands. When the network is reconfigured due to defragmentation, it is possible that existing connections may be disrupted.

In order to defragment the network, it may be necessary to reconfigure the network so that the spectral fragments can be consolidated into contiguous blocks. This further requires that existing connections be reconfigured either by changing routes, assigning different spectrum at the transceivers, or converting wavelength in the intermediate nodes. Existing live connections may be disrupted during this process, which may lead to data loss and a poor user experience.

The present disclosure provides a way to avoid or minimize having to defragment a network by reducing or minimizing the amount of fragmentation in the work. In some embodiments, a spectrum allocation method may be implemented. The available channels may be divided into equal-sized bins. For example, if 120 channels are available based on the total available spectrum and the channel bandwidth, and if a bin size of 12 is implemented, then 10 bins of 12 channels each may be allocated. One bin may be allocated to each source/destination link request. When additional bandwidth is requested for that particular source/destination link request, unused channels within the assigned bin may be allocated to the request.

When the last bin is reached, the channels in the last bin may be allocated using reverse channel assignment. In one example, reverse channel assignment may be implemented by allocating channels to a first request in a first order (e.g., top-down) and to a second request from the opposite direction (e.g., bottom-up). A third request may be allocated from the center channel of the bin. Fourth and subsequent requests may be allocated in a random direction from the center allocation (while maintaining guard bands), until the remaining slots are allocated. More generally, reverse channel assignment can be implemented by allocating channels from opposite ends of the bin for the first two requests, and allocating the third request from the center or other channel that has not already been allocated. Additional requests can be allocated randomly, alternating from either side of the center allocation, round robin, or other methods.

By providing a spectrum allocation algorithm that reduces the amount of spectrum fragmentation, the potential waste of available spectrum may be avoided. Maintaining efficient use of available channels is important for managing optical networks, and the described techniques can enable a cost-effective way to achieve such objectives.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The disclosed embodiments describe technologies for efficient spectrum allocation in a multi-node network. In some examples, the multi-node network may be an optical network. An optical network that allocates spectrum for a shared transmission medium resource between multiple users, such as in a long-haul optical network, may need to dynamically allocate the available transmission channels at multiple points along the network. However, spectrum fragmentation can occur due to the transmission channels being allocated independently and isolated from needs of the overall network. For example, frequency slots can be allocated in a non-aligned and non-contiguous manner, resulting in gaps of unused available slots that have developed and that cannot be allocated to new connection requests due to optical layer restrictions.

In the case of an elastic optical network, it is common to achieve flexibility by defining small spectrum granularity and assigning an integer number of slots to the requests. However, as the granularity of bandwidth allocation becomes finer, an incoming connection may request a large number of spectral slots that need to be allocated together to maintain high spectral efficiency. Since an elastic optical network allows connections to be assigned with nonuniform spectral resources, it will typically fragment the spectrum, leaving small blocks of spectrum slots unavailable for large requests. Fragmentation may result in poor spectrum utilization and a high blocking ratio.

Figure 1:
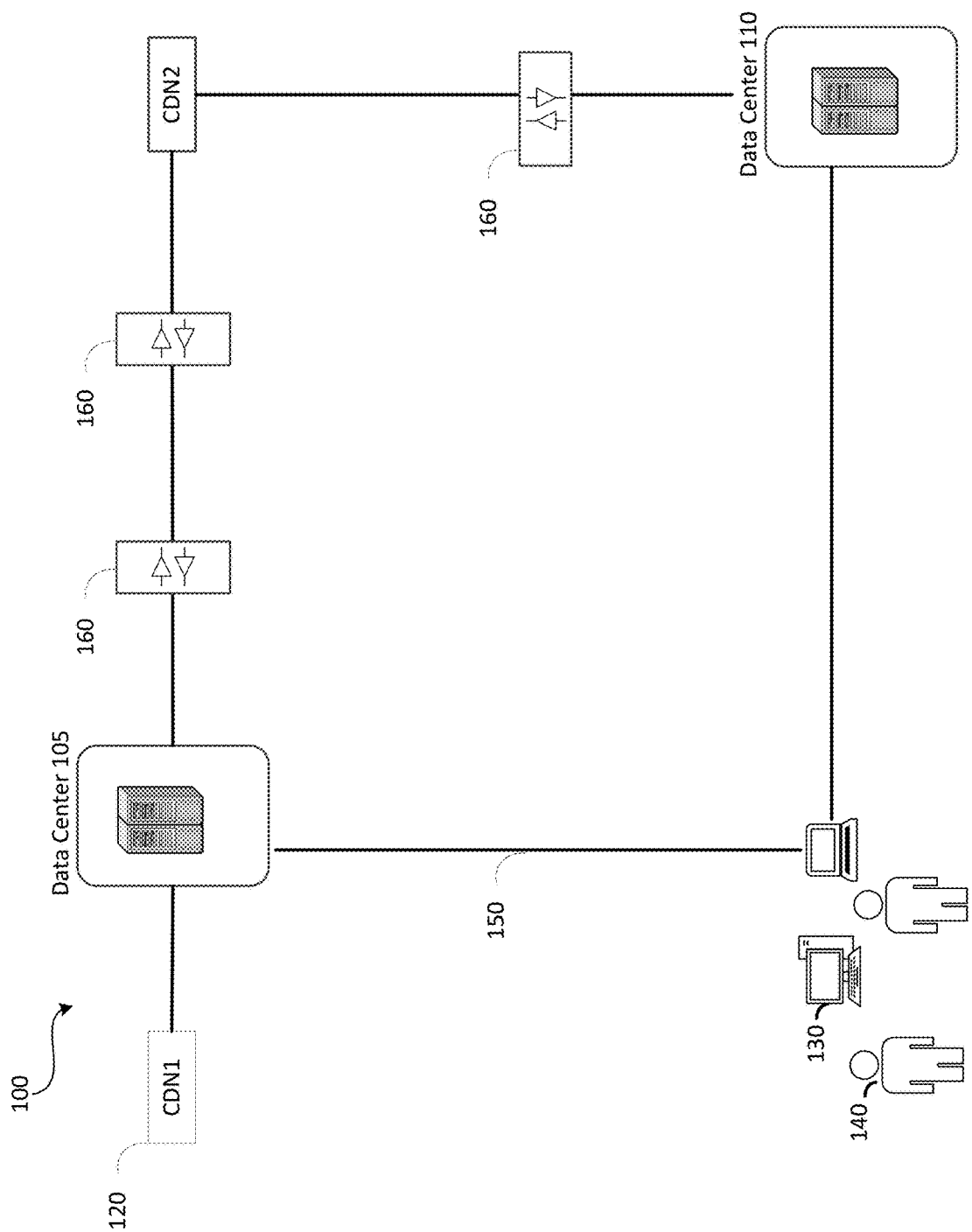
FIG. 1 is a diagram illustrating an example data center environment in accordance with the present disclosure.

FIG. 1 illustrates an example environment 100 in which embodiments of the disclosure may be implemented. Data centers 105 and 110 may be connected by a fiber optic network 150, and may provide computing resources to users 140 (which may be referred herein singularly as "a user 140" or in the plural as "the users 140") accessing the computing resources using client computers 130 (which may be referred herein singularly as "a computer 130" or in the plural as "the computers 130"). The computing resources provided by the data centers 105 and 110 may include various types of resources, such as computing resources, data storage resources, data communication resources, and the like. Data centers 105 and 110 may further allow distribution networks 120 to provide access to computing resources. Depending on physical distances, nodes 160 may be installed at various points in the network. In some embodiments, nodes 160 may be optical add-drop nodes or multiplexers. The optical add-drop nodes or multiplexers may be configured to add or drop one or more new wavelength channels to/from an existing multi-wavelength wavelength-division multiplexing (WDM) signal. An optical add-drop node or multiplexer can be used to insert, remove, or route channels to increase network flexibility.

Figure 2A:
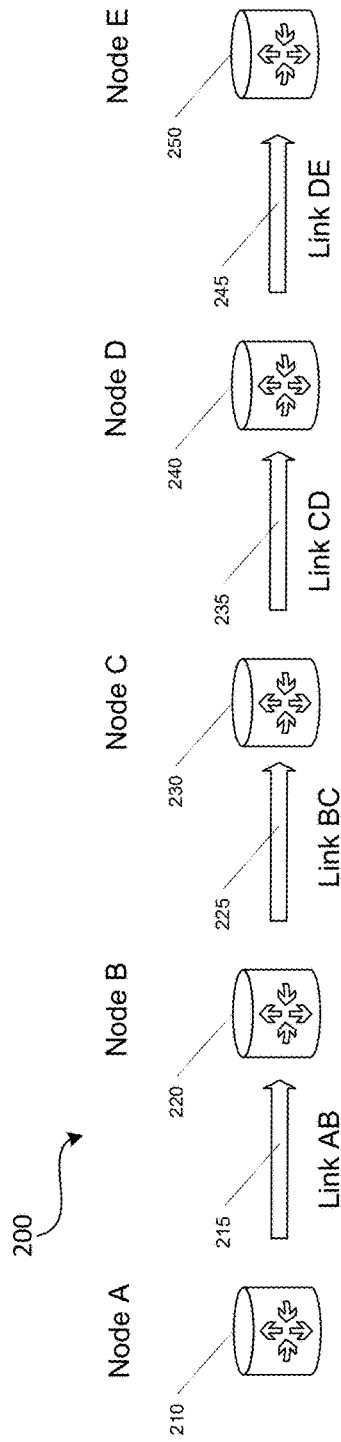
FIG. 2A is an example network topology in accordance with the present disclosure.

An example linear optical network illustrating embodiments of the present disclosure is shown in FIG. 2A, which shows a 5 node, 4-link network 200 with Node A 210, Node B 220, Node C 230, Node D 240, and Node E 250. The network 200 may have Link AB 215 that connects Node A 210 and Node B 220, Link BC 225 that connects Node B 220 and Node C 230, Link CD 235 that connects Node C 230 and Node D 240, and Link DE 245 that connects Node D 240 and Node E 250. The nodes may be optical add-drop nodes or multiplexers.

Figure 2B:
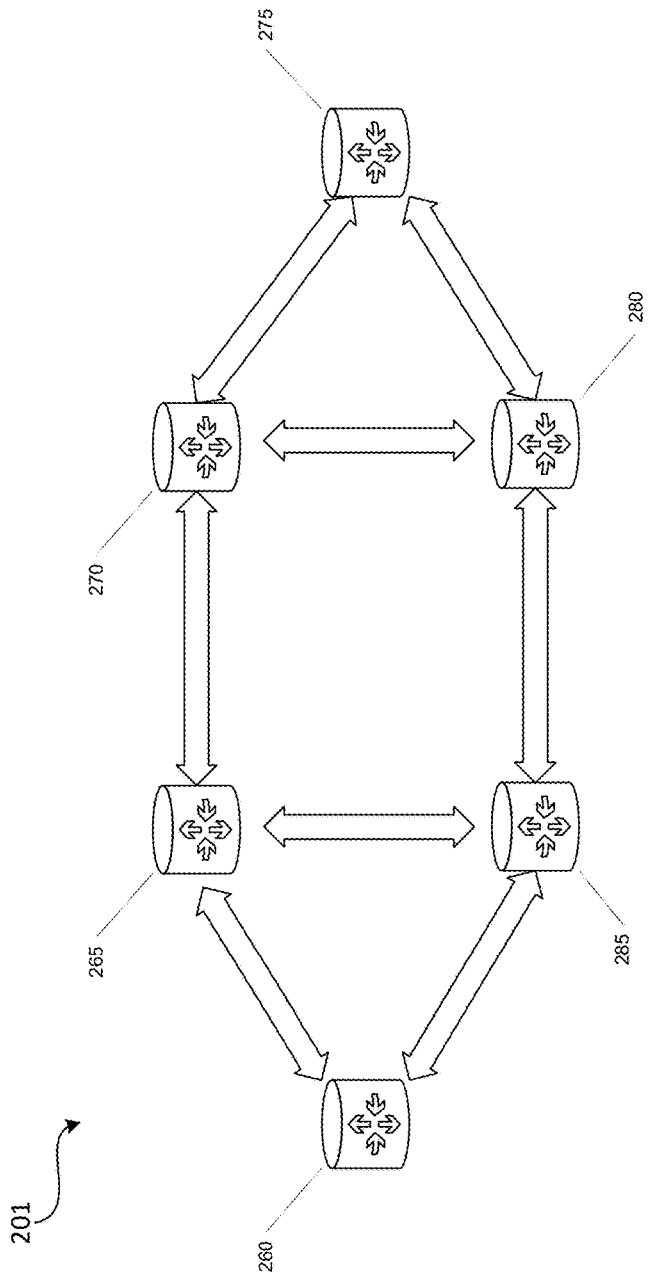
FIG. 2B is an example network topology in accordance with the present disclosure.

An example mesh optical network illustrating embodiments of the present disclosure is shown in FIG. 2b, which shows a 6 node, 8-link network 201.

Figure 3:
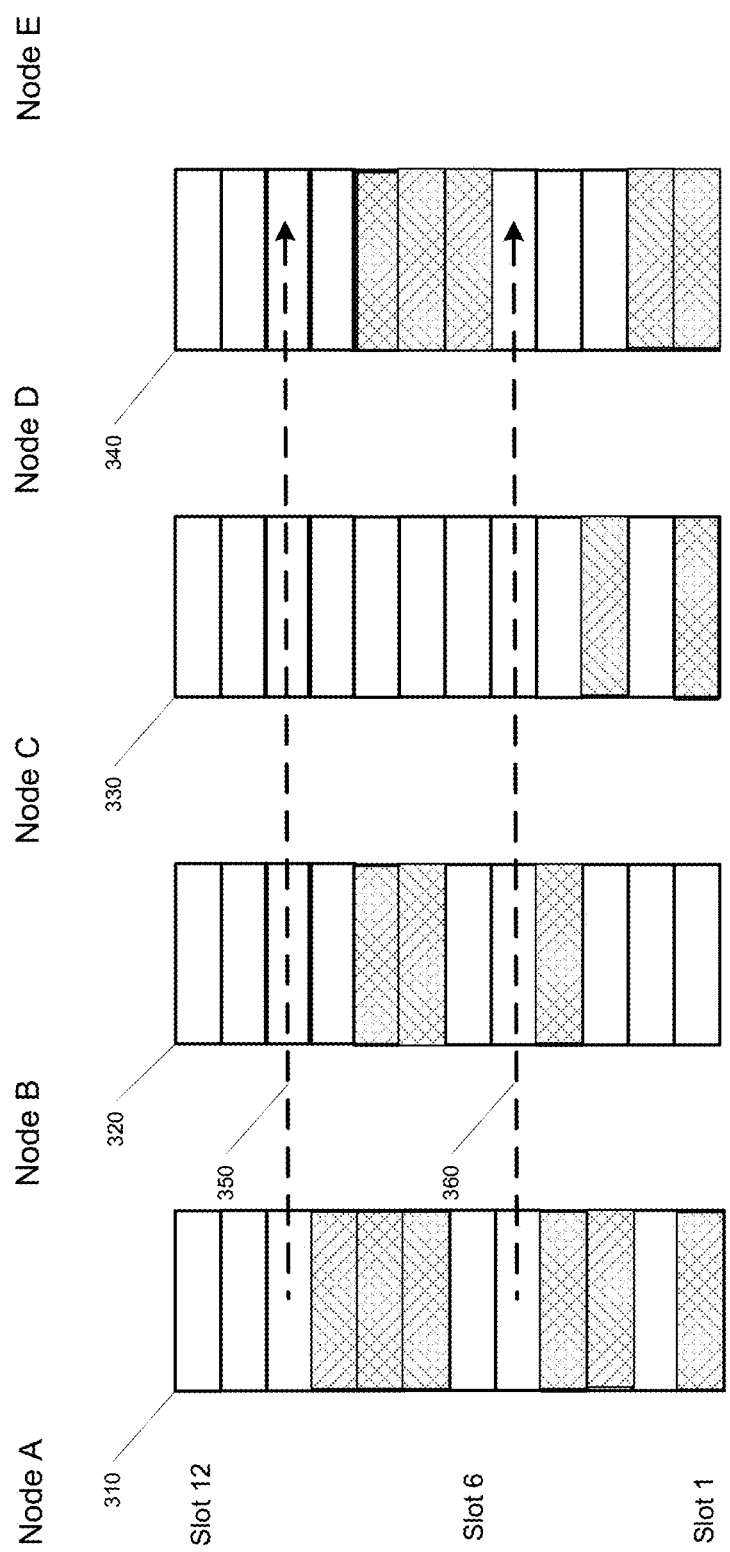
FIG. 3 is an example allocation of spectrum in accordance with the present disclosure.

The spectral resources for network 200 shown in FIG. 2 are distributed as shown in FIG. 3, which also shows a more detailed example of the effect on the spectral fragments that can result from a channel and path provisioning process. For simplicity, in this example only twelve spectrum slots are shown on each fiber link. FIG. 3 illustrates slots for Link AB 310, slots for Link BC 320, slots for Link CD 330, and slots for Link DE 340. In one example, a new allocation request is received for connecting nodes A-E, and the request is for a bandwidth requirement of 1 slot. A routing process may allocate slots as shown by allocation 350, or by allocation 360. Both allocations result in a break in the contiguousness of a spectral block on one of the links on the current path. Such breaks can create fragments on in the spectral allocations, as described above.

For example, the provisioning of the request on path ABCDE with slot 10 by allocation 350 will cut spectrum blocks on link BC 320 in the contiguous spectral slots 9-12, link CD 330 in the contiguous spectral slots 4-12, and on link DE 340 in the contiguous spectral slots 9-12. Likewise, allocation 360 will cut spectrum blocks on link CD 330 in the contiguous spectral slots 4-12. The spectrum blocks may become more fragmented as they lose contiguity in the spectral domain.

Various embodiments disclosed herein describe techniques for avoiding spectrum fragmentation in such networks. In one embodiment, the spectral slots may be divided into equal-sized bins. For example, if 120 slots are available based on the total available spectrum and the channel bandwidth, and if a bin size of 12 is implemented, then 10 bins of 12 channels each may be allocated.

In an embodiment, one bin may be allocated to each source/destination link request. When additional bandwidth is requested for that particular source/destination link request, unused channels within the assigned bin may be allocated to the request. This allows for a number of contiguous slots to be available for a given request.

When the last bin is reached, the slots in the last bin may be allocated using a reverse channel assignment procedure. In one embodiment, reverse channel assignment may be implemented by allocating channels to a first request in a first order (e.g., top-down) and to a second request from the opposite direction (e.g., bottom-up). For example, a request for a single slot may be fulfilled by allocating slot 12, and a second request for a single slot can be fulfilled by allocating slot 1. A third request may be allocated from the center channel of the bin. For example, slot 6 or slot 7 may be allocated for a third request for a single slot. Fourth and subsequent requests may be allocated in a random direction from the center allocation (while maintaining guard bands), until the remaining slots are allocated.

Figure 4A:
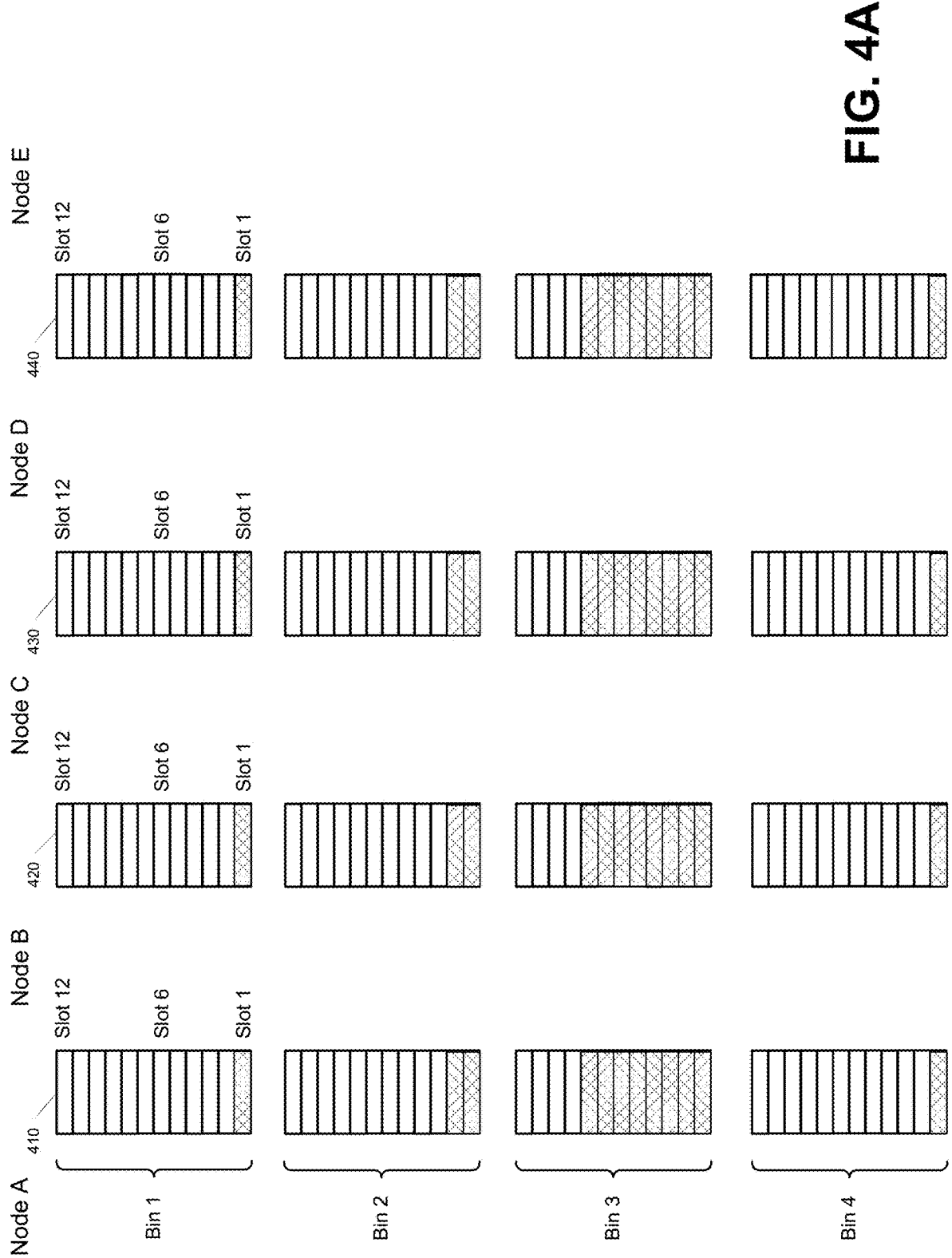
FIG. 4A is an example allocation of spectrum in accordance with the present disclosure.

In one example, referring to FIG. 4A, illustrated is an example where 48 slots are divided into 12 slot bins. In link AB 410, a first request for a slot may receive an allocation of bin 1, and slot 1 of bin 1 may be assigned to the request. A second request for two slots may receive an allocation of bin 2, and slots 1 and 2 may be assigned to fulfill the request for two slots. A third request for eight slots may receive an allocation of bin 3, and slots 1 through 8 may be assigned to fulfill the request for eight slots. A fourth request for one slot may receive an allocation of bin 24 and slot 1 may be assigned to fulfill the request for the one requested slot.

Figure 4B:
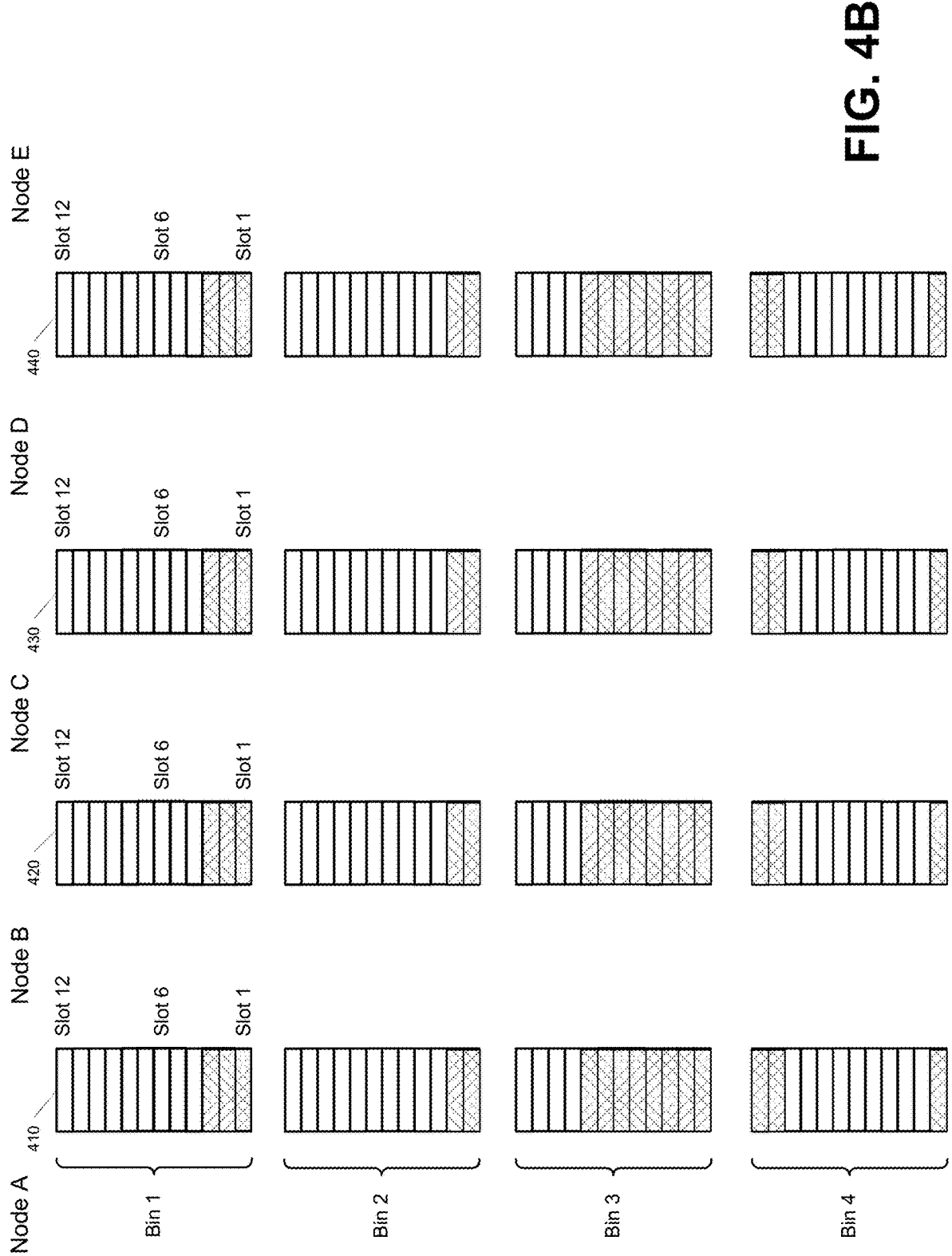
FIG. 4B is an example allocation of spectrum in accordance with the present disclosure.

Referring to FIG. 4B, the requesting connection that has been assigned bin 1 has been assigned slots 2 and 3 of bin 1 in response to a request for two additional slots. Additionally, an additional connection has been requested with a request for two slots. Since bins 1, 2, and 3 have been allocated, slots 11 and 12 of bin 4 is allocated to this request. Slots 11 and 12 are selected in the opposite direction of this last bin, since the first request for this bin was assigned slot 1.

Figure 4C:
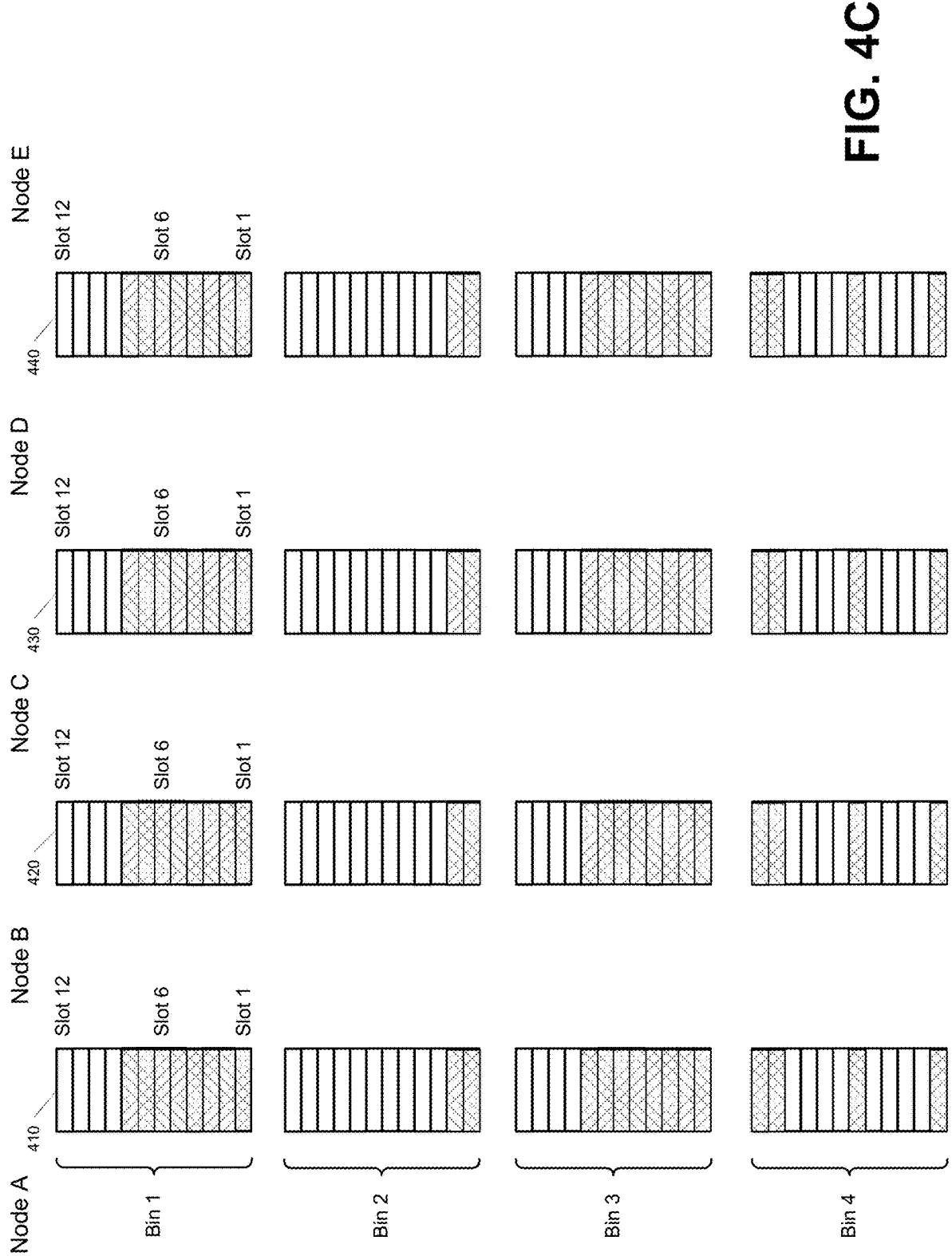
FIG. 4C is an example allocation of spectrum in accordance with the present disclosure.

Referring to FIG. 4C, the requesting connection that has been assigned bin 1 has been assigned slots 4-8 of bin 1 in response to a request for five additional slots. Additionally, an additional connection has been requested with a request for one slot. Since bins 1, 2, and 3 have been allocated, slot 6 of bin 4 is allocated to this request. Slot 6 is selected at the center of this last bin, since the first request for this bin was assigned slot 1 and the second request for this bin was assigned slots 11 and 12.

Figure 4D:
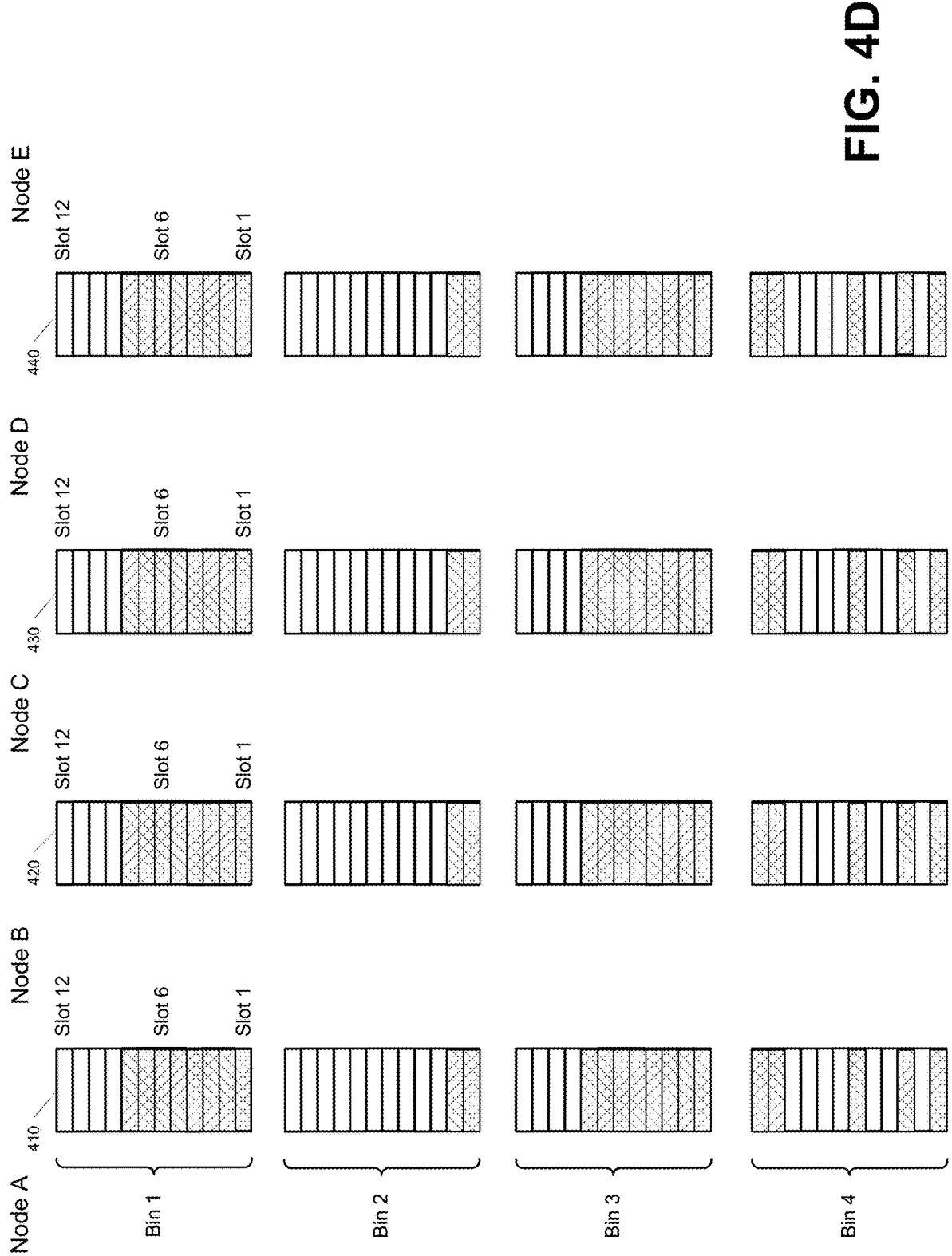
FIG. 4D is an example allocation of spectrum in accordance with the present disclosure.

Referring to FIG. 4D, an additional connection has been requested with a request for one slot. Since bins 1, 2, and 3 have been allocated, slot 3 of bin 4 is randomly selected and allocated to this request. The request is allocated randomly from the last bin since the first request for this bin was assigned slot 1, the second request for this bin was assigned slots 11 and 12, and the third request was assigned slot 6 from the center. Subsequent requests may be allocated in a random direction from the center allocation (while maintaining guard bands), until the remaining slots are allocated.

The described allocation method may be implemented both in long-haul and metro optical systems where dynamic allocation is performed between links (e.g., channels can be added or dropped at each network link). The bin size may be determined based on hardware characteristics of the optical network, such as the multiplexer channel structure. If the bin size is arbitrarily selectable, then the bin size can be determined based on factors such as a predicted bandwidth requirement for expected users, guard band requirements, and desired allocation flexibility.

The described allocation method allows bins to be independently allocated to source/destination pairs rather than individual channels, thus avoiding conflicts for channel allocation for closely spaced channels while avoiding areas of unused spectrum.

In some embodiments, variations to the above described algorithm may be implemented. In one embodiment, the above described algorithm may include application of the reverse channel assignment procedure to bins other than the last bin, based on previous allocations and currently unallocated requests.

In some embodiments, the above described algorithm may include application of the algorithm to mesh networks by dividing the network into individual point-to-point links. In one embodiment, the paths from each network link may be analyzed and bins may be allocated for a selected link from multiple possible paths. In an embodiment, a shortest-path selection method may be used.

It should also be appreciated that the examples described above are merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing or networking device may comprise any combination of hardware or software that can interact and perform the described types of functionality, including without limitation desktop or other computers, database servers, network storage devices and other network devices, tablets, intermediate networking devices, and various other devices that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
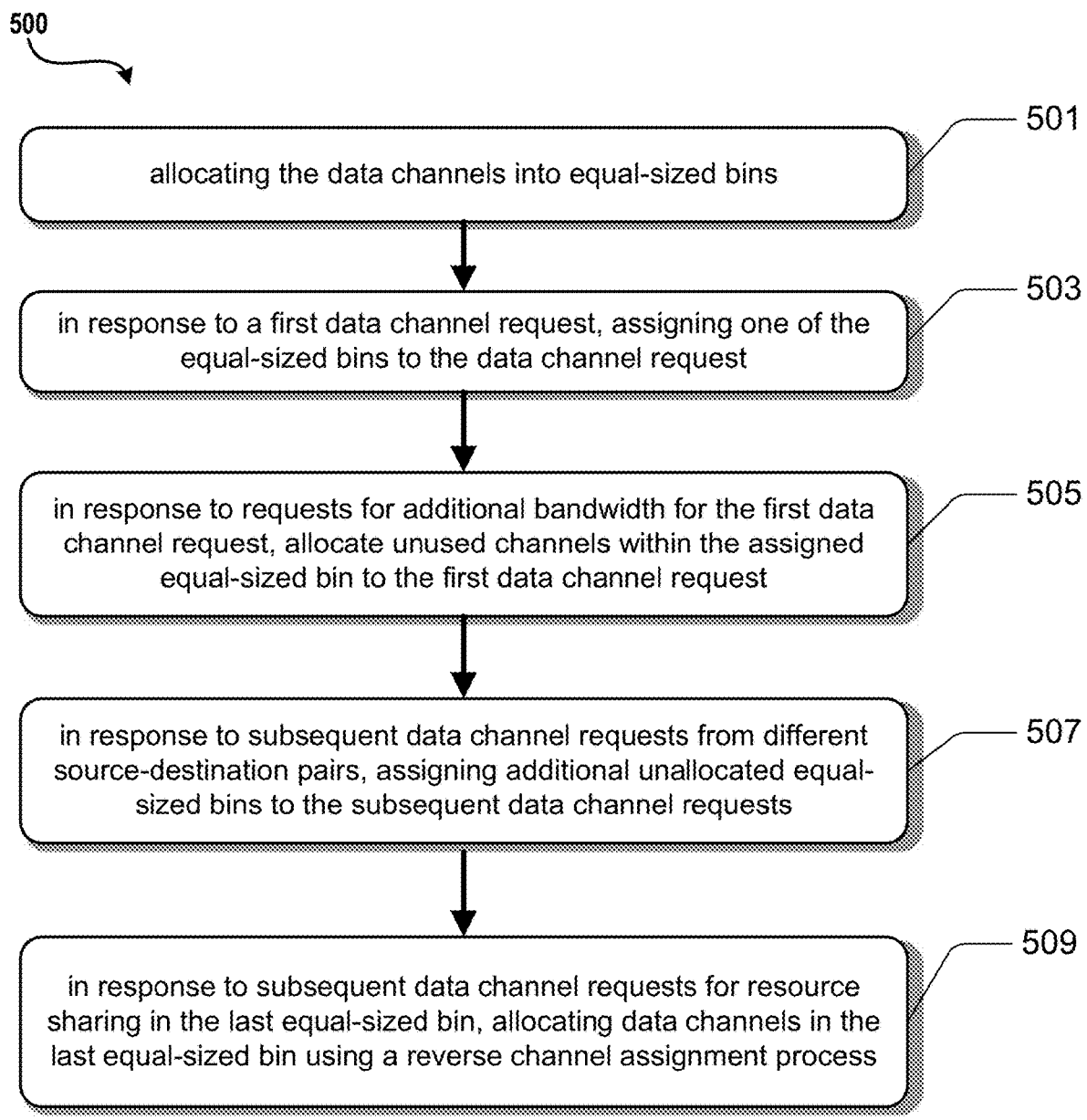
FIG. 5 is a flowchart depicting an example procedure in accordance with the present disclosure.

Turning now to FIG. 5, illustrated is an example flowchart for implementing an optical communications network in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The operations in FIG. 5 can be performed, for example, by a device configured to communicatively couple to an optical communications network. The optical communications network may include an optical transmission medium configured to transmit data signals on a plurality of optical signals carried on a plurality of optical wavelengths. The optical communications network may further comprise a plurality of optical data links interconnected by a plurality of switching nodes, the optical data links comprising a plurality of data channels, as described above with respect to any one of FIGS. 1-5.

Operation 501 illustrates allocating the data channels into equal-sized bins. Operation 501 may be followed by operation 503. Operation 503 illustrates in response to a first data channel request from a given source-destination pair, assigning one of the equal-sized bins to the data channel request. Operation 503 may be followed by operation 505. Operation 505 illustrates in response to requests for additional bandwidth for the first data channel request, allocate unused channels within the assigned equal-sized bin to the first data channel request. Operation 505 may be followed by operation 507. Operation 507 illustrates in response to subsequent data channel requests from different source-destination pairs, assigning additional unallocated equal-sized bins to the subsequent data channel requests. Operation 507 may be followed by operation 509. Operation 509 illustrates in response to subsequent data channel requests for resource sharing in the last one equal-sized bin, allocating data channels in the last equal-sized bin using a reverse channel assignment process. In an embodiment, the reverse channel assignment process allocates data channels from opposite ends of the last equal-sized bin before allocating remaining data channels.

In an embodiment, the reverse channel assignment comprises allocating data channels in the remaining bin to a first request in a first order, a second request in a second order, and a third request from a center data channel of the bin.

In an embodiment, data channels for fourth and subsequent requests are allocated in a random direction from the center data channel allocation until the remaining slots are allocated.

In an embodiment, a size of the equal-sized bins is determined based on one or more of a predicted bandwidth requirement for expected users of the optical communications network, guard band requirements, and desired allocation flexibility.

In an embodiment, computer-readable instructions are stored that, when executed by the one or more processors, cause the system to perform operations comprising applying the reverse channel assignment process to bins other than the last equal-sized bin to respond to requests from different source-destination pairs.

In an embodiment, the reverse channel assignment process is further based on previous allocations and currently unallocated requests.

Figure 6:
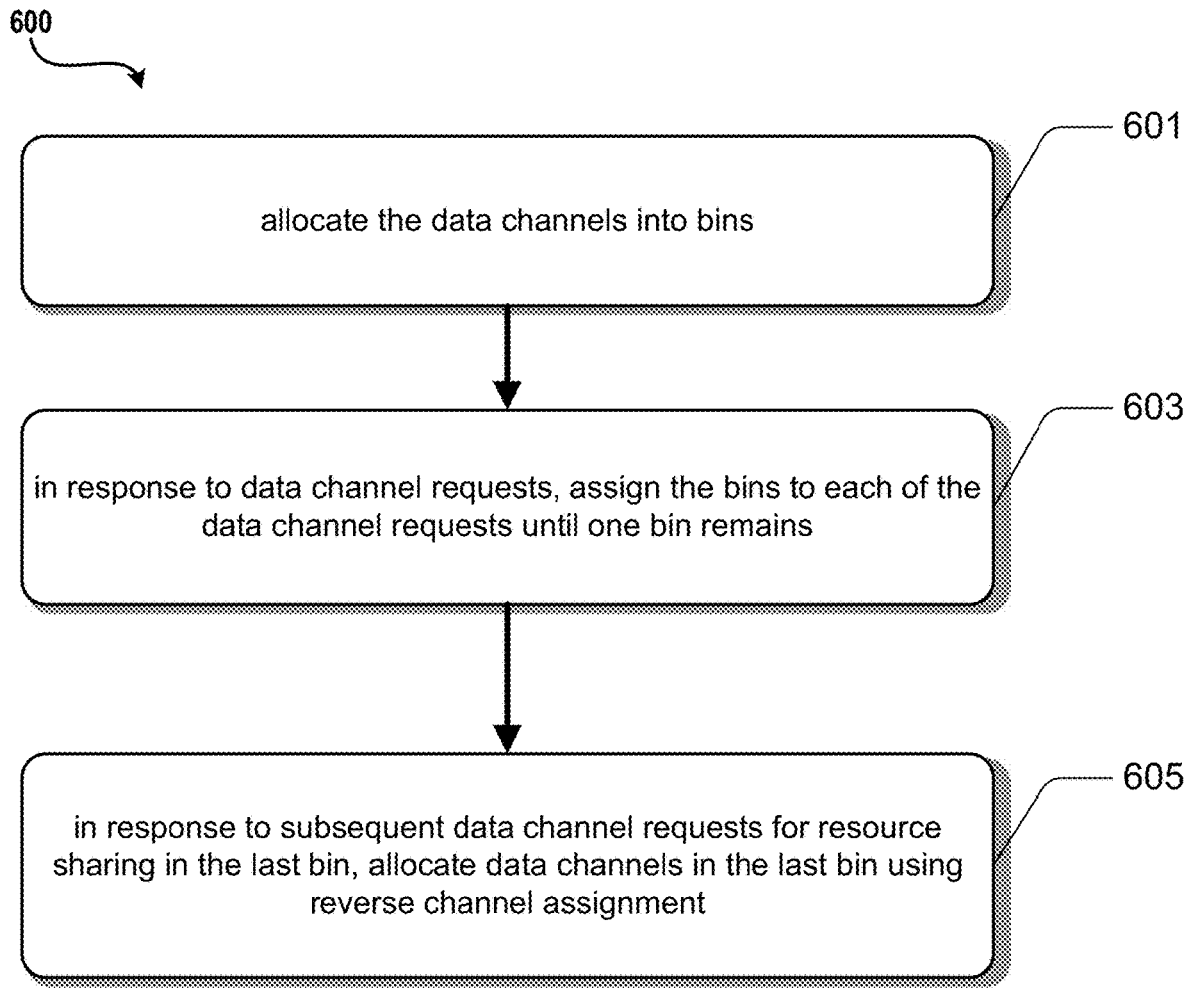
FIG. 6 is a flowchart depicting an example procedure in accordance with the present disclosure.

In an embodiment, the first order is top-down and the second order is bottom-up. Turning now to FIG. 6, illustrated is an example operational procedure for implementing an optical communications network in accordance with the present disclosure. The operational procedure may be implemented in a system comprising a plurality of optical data links comprising a plurality of data channels and one or more switching nodes communicatively coupled to the plurality of optical data links. Referring to FIG. 6, operation 601 illustrates allocating the data channels into bins.

Operation 601 may be followed by operation 603. Operation 603 illustrates in response to data channel requests, assigning the bins to each of the data channel requests until one bin remains.

Operation 603 may be followed by operation 605. Operation 605 illustrates in response to subsequent data channel requests in which until one bin remains, allocating data channels in the last bin using reverse channel assignment. In an embodiment, data channels are allocated from opposite ends of the last bin before allocating remaining data channels in the last bin.

In an embodiment, the system is further configured to:

in response to requests for additional bandwidth for one of the data channel requests, allocating unused channels within the assigned bin.

In an embodiment, the optical communications network is a mesh network, wherein the system is further configured to:

divide the optical communications network into individual point-to-point links; and allocating the data channels to the point-to-point links.

In an embodiment, the optical communications network is a mesh networks, wherein the system is further configured to:

analyze paths from each network link and allocating bins for a selected link from multiple possible paths.

In an embodiment, the reverse channel assignment comprises allocating data channels in the remaining bin to a first request in a first order, a second request in a second order, and a third request from a center data channel of the bin.

In an embodiment, data channels for fourth and subsequent requests are allocated in a random direction from the center data channel allocation until the remaining slots are allocated.

In an embodiment, the system is further configured to apply the reverse channel assignment to bins other than the last bin to respond to requests from different source-destination pairs.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 7:
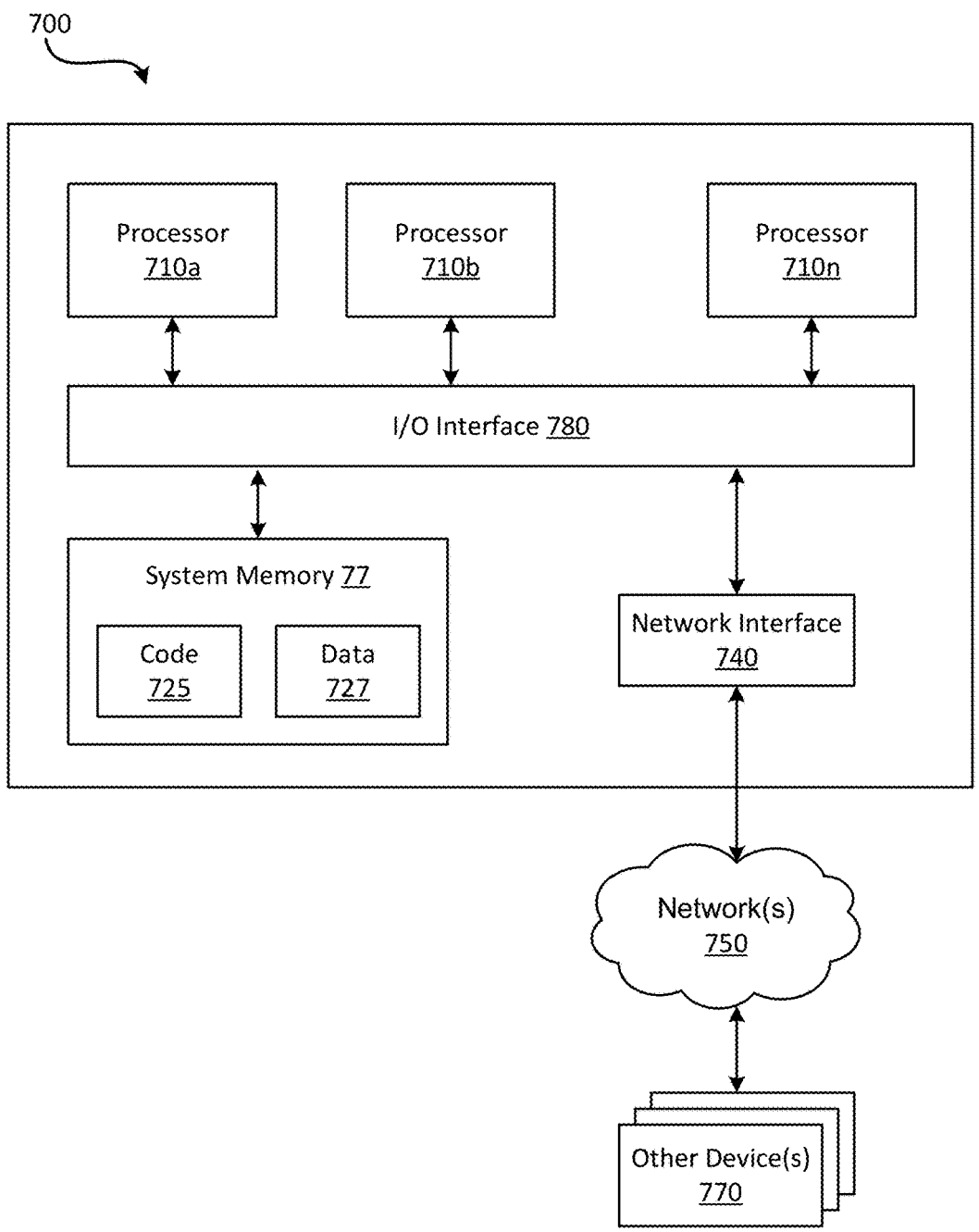
FIG. 7 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 7 illustrates such a general-purpose computing device 700. In the illustrated embodiment, computing device 700 includes one or more processors 710*a*, 710*b*, and/or 710*n* (which may be referred herein singularly as "a processor 710" or in the plural as "the processors 710") coupled to a system memory 77 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 77 may be configured to store instructions and data accessible by processor(s) 710. In various embodiments, system memory 77 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 77 as code 725 and data 727.

In one embodiment, I/O interface 730 may be configured to coordinate I/O traffic between the processor 710, system memory 77, and any peripheral devices in the device, including network interface 740 or other peripheral interfaces. In some embodiments, I/O interface 730 may perform any necessary protocol, timing, or other data transformations to convert data signals from one component (e.g., system memory 77) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 77, may be incorporated directly into processor 710.

Network interface 740 may be configured to allow data to be exchanged between computing device 700 and other device or devices 770 attached to a network or network(s) 750, such as other computer systems or devices as illustrated in FIGS. 1 through 4, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 77 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 77 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system configured to communicatively couple to an optical communications network comprising a plurality of optical data links interconnected by a plurality of optical add-drop nodes, the optical data links comprising a plurality of data channels, the system comprising:
    one or more processors; and
    a memory in communication with the one or more processors, the memory having computer-readable instructions stored thereupon that, when executed by the one or more processors, cause the system to perform operations comprising:
    allocating the data channels into equal-sized bins;
    in response to a first data channel request from a given source-destination pair, assigning a first bin of the equal-sized bins to the data channel request, wherein the first bin is reserved for requests from the given source-destination pair;

in response to requests for additional bandwidth for the first data channel request, allocating unused channels within the first bin to the first data channel request;

in response to subsequent data channel requests from different source-destination pairs, assigning additional unallocated equal-sized bins to the subsequent data channel requests, wherein each of the additional unallocated equal-sized bins are reserved for requests from respective ones of the different source-destination pairs; and in response to subsequent data channel requests for resource sharing in the last equal-sized bin, allocating data channels in the last equal-sized bin using a reverse channel assignment process that allocates data channels from opposite ends of the last equal-sized bin before allocating remaining data channels.

2. The system of claim 1, wherein the reverse channel assignment process comprises allocating data channels in a remaining bin to a first request in a first order, a second request in a second order, and a third request from a center data channel of the remaining bin.

3. The system of claim 2, wherein data channels for fourth and subsequent requests are allocated in a random direction from the center data channel allocation until remaining slots are allocated.

4. The system of claim 2, wherein the first order is top-down and the second order is bottom-up.

5. The system of claim 1, wherein a size of the equal-sized bins is determined based on one or more of a predicted bandwidth requirement for expected users of the optical communications network, guard band requirements, and desired allocation flexibility.

6. The system of claim 1, further comprising computer-readable instructions stored thereupon that, when executed by the one or more processors, cause the system to perform operations comprising applying the reverse channel assignment process to bins other than the last equal-sized bin to respond to requests from different source-destination pairs.

7. The system of claim 6, wherein the reverse channel assignment process is further based on previous allocations and currently unallocated requests.

8. An optical communications network comprising:
a plurality of optical data links comprising a plurality of data channels;
one or more optical add-drop nodes communicatively coupled to the plurality of optical data links; and
a system configured to:
allocate the data channels into equal-sized bins;
in response to a first data channel request from a given source-destination pair, assign a first bin of the equal-sized bins to the data channel request, wherein the first bin is reserved for requests from the given source-destination pair;
in response to requests for additional bandwidth for the first data channel request, allocate unused channels within the first bin to the first data channel request;
in response to subsequent data channel requests from different source-destination pairs, assign additional unallocated equal-sized bins to the subsequent data channel requests, wherein each of the additional unallocated equal-sized bins are reserved for requests from respective ones of the different source-destination pairs; and
in response to subsequent data channel requests for resource sharing in the last equal-sized bin, allocate data channels in the last equal-sized bin using a reverse channel assignment process that allocates data channels from opposite ends of the last equal-sized bin before allocating remaining data channels.

9. The optical communications network of claim 8, wherein the reverse channel assignment process comprises allocating data channels in a remaining bin to a first request in a first order, a second request in a second order, and a third request from a center data channel of the remaining bin.

10. The optical communications network of claim 9, wherein data channels for fourth and subsequent requests are allocated in a random direction from the center data channel allocation until remaining slots are allocated.

11. The optical communications network of claim 9, wherein the first order is top-down and the second order is bottom-up.

12. The optical communications network of claim 8, wherein a size of the equal-sized bins is determined based on one or more of a predicted bandwidth requirement for expected users of the optical communications network, guard band requirements, and desired allocation flexibility.

13. The optical communications network of claim 8, wherein the system is further configured to perform operations comprising applying the reverse channel assignment process to bins other than the last equal-sized bin to respond to requests from different source-destination pairs.

14. The optical communications network of claim 13, wherein the reverse channel assignment process is further based on previous allocations and currently unallocated requests.

15. A method implemented on an optical communications network comprising a plurality of optical data links comprising a plurality of data channels and one or more switching nodes communicatively coupled to the plurality of optical data links, the method comprising:
allocating the data channels into equal-sized bins;
in response to a first data channel request from a given source-destination pair, assigning a first bin of the equal-sized bins to the data channel request, wherein the first bin is reserved for requests from the given source-destination pair;
in response to requests for additional bandwidth for the first data channel request, allocating unused channels within the first bin to the first data channel request;
in response to subsequent data channel requests from different source-destination pairs, assigning additional unallocated equal-sized bins to the subsequent data channel requests, wherein each of the additional unallocated equal-sized bins are reserved for requests from respective ones of the different source-destination pairs; and
in response to subsequent data channel requests for resource sharing in the last equal-sized bin, allocating data channels in the last equal-sized bin using a reverse channel assignment process that allocates data channels from opposite ends of the last equal-sized bin before allocating remaining data channels.

16. The method of claim 15, wherein the reverse channel assignment process comprises allocating data channels in a remaining bin to a first request in a first order, a second request in a second order, and a third request from a center data channel of the remaining bin.

17. The method of claim 16, wherein data channels for fourth and subsequent requests are allocated in a random direction from the center data channel allocation until remaining slots are allocated.

18. The method of claim 15, wherein a size of the equal-sized bins is determined based on one or more of a predicted bandwidth requirement for expected users of the optical communications network, guard band requirements, and desired allocation flexibility.

19. The method of claim 15, further comprising applying the reverse channel assignment process to bins other than the last equal-sized bin to respond to requests from different source-destination pairs.

20. The method of claim 15, wherein the reverse channel assignment process is further based on previous allocations and currently unallocated requests.

* * * * *